United States Patent [19]

Tucker et al.

[11] Patent Number: 5,334,985
[45] Date of Patent: Aug. 2, 1994

[54] AZIMUTH RANGE VELOCITY DISPLAY AND CURSOR FOR USE THEREWITH

[76] Inventors: Stephen P. Tucker, 73 Eighth Avenue, St. Peters, S.A. 5069; Samuel B. Colegrove, 3 Blamey Court, Highbury, S.A. 5089, both of Australia

[21] Appl. No.: 880,731

[22] Filed: May 6, 1992

[30] Foreign Application Priority Data

May 6, 1991 [AU] Australia .............................. PK6000
May 6, 1991 [AU] Australia .............................. PK6001

[51] Int. Cl.$^5$ ............................................. G01S 13/00
[52] U.S. Cl. ..................................... 342/176; 342/109
[58] Field of Search ............... 342/176, 177, 182, 183, 342/109

[56] References Cited

U.S. PATENT DOCUMENTS

| | | | |
|---|---|---|---|
| 2,894,259 | 7/1959 | Korn et al. ............................ | 343/11 |
| 3,891,987 | 6/1975 | Jensen . | |
| 3,898,659 | 8/1975 | Jensen et al. ............................ | 343/8 |
| 3,900,872 | 8/1975 | Jensen et al. ............................ | 343/9 |
| 4,249,178 | 2/1981 | Butler . | |
| 4,833,475 | 5/1989 | Pease et al. ........................ | 342/185 |

FOREIGN PATENT DOCUMENTS

| | | |
|---|---|---|
| 262307 | 1/1963 | Australia . |
| 0099160 | 1/1984 | European Pat. Off. . |
| 1098133 | 1/1968 | United Kingdom . |
| 2024557 | 1/1980 | United Kingdom . |
| 2124446 | 2/1984 | United Kingdom . |
| 2172461 | 9/1986 | United Kingdom . |

OTHER PUBLICATIONS

Headrick et al., "Over-the horizon Radar in the HF Band", Proceedings of the IEEE, vol. 62, No. 6, Jun., 1974, pp. 664-673.

*Primary Examiner*—Mark Hellner
*Attorney, Agent, or Firm*—Cushman Darby & Cushman

[57] ABSTRACT

A method of displaying and determining the velocity of radar returns of frequency modulated continuous wave radars including the steps of determining a velocity for each radar return from a detected beat frequency associated with received radar returns, and displaying (for successive radar dwells) one or more major plots indicating range, azimuth and velocity of any radar returns. Each major plot is characterized by a velocity axis with a maximum and a minimum display velocity. The major plots are composed of minor plots indicating range, azimuth and velocity of any radar return and are characterized by a velocity axis that extends between zero velocity and the magnitude of greatest possible velocity corresponding to the range of the detected beat frequencies. Between successive radar dwells, radar returns on one side of the said zero velocity remain substantially in the same display position whereas associated radar returns displayed on the other side of the zero velocity do not remain substantially in the same position. Furthermore, classification of radar returns is assisted by displaying the radar returns on a display, displaying predicted radar return positions of a radar return on the display where the prediction of the position of the radar returns is in accordance with radar return azimuth from an antenna and estimates of the heights of the E and F layers.

34 Claims, 7 Drawing Sheets

AZIMUTH RANGE VELOCITY DISPLAY AND CURSOR FOR USE THEREWITH

BACKGROUND OF THE INVENTION

1. Field of the Invention

The present invention relates to a method and apparatus for displaying radar information including a cursor or template for use with this displayed radar information. The invention is useful with Frequency Modulated Continuous Wave radar systems employing waveform agility, i.e., systems employing variable radar carrier frequencies and waveform repetition rates. One application for the invention is radar systems using Over-the-Horizon-Radars.

2. Description of the Related Art

Frequency Modulated Continuous Wave radar systems make use of the property that signals of slightly different frequencies give rise to beat frequencies. Radar return signals reflected from a moving target will be shifted in frequency due to the velocity of the target. This frequency shift is due to the phenomena known as the Doppler effect. Doppler shifted radar return signals give rise to beat frequencies. These can be detected and converted into a value of the velocity of the radar target. However, due to the nature of the generation of the beat frequencies, the beat frequency does not provide information as to whether the target is coming toward the radar or moving away. Previous radar systems requires measurements to be made of radar returns of successive radar dwells. The present invention provides a method of determining the velocity of a target and whether a target is closing or retreating from the radar with minimal computation of radar returns of successive radar dwells.

The present invention is useful with radars employing waveform agility. Such a radar will employ variable waveform repetition frequency and variable carrier frequency. These waveform parameters will be constant for each radar dwell but will vary intentionally from dwell to dwell. Waveform agility is desirable for many reasons including:

a) blind-speed unmasking to reveal targets masked by radar clutter return signal,
b) countering radar jamming measures, and
c) avoidance of other users of the frequency spectrum.

After signal processing, the radar returns are displayed on a visual display as video data. Employing waveform agility affects the video data which is displayed on a visual display. It has been known to display the video data in terms of range, azimuth and Doppler space. A Doppler frequency within the Doppler space for fixed waveform repetition frequency and fixed carrier frequency can be considered as a velocity of a detected target. The Doppler frequency is effectively the velocity of a target and corresponds to the shift in frequency of the return signal from the transmitted signal. The term "Doppler frequency" will be used herein to indicate Doppler space data displayed in terms of velocity, or Doppler space data that can be displayed in terms of velocity. In the case of OTHR the video data is known to be displayed in terms to Azimuth, with nested range versus Doppler frequency.

To facilitate operator confirmation of tracks, a series of successive radar scans are presented in a cyclically animating sequence. This also has the advantage of combating target fading by allowing visual integration.

For fixed waveform repetition frequency and carrier frequency the Doppler frequency axis of a display can be interpreted as velocity with respect to the radar. Targets with a constant radial velocity with respect to the radar will maintain a fixed position in the Doppler space.

The stationarity of the targets in Doppler space is effected by factors other than target movement. If the waveform parameters change, then this stationarity is lost. In practice, the stationarity will only exist for a single dwell as waveform parameters can change from dwell to dwell. Consequently, a target will appear to have a varying Doppler frequency and the target display position will jitter on the visual display. The variations in the radar parameters lead to an ambiguous velocity range $V_{amb}$. This can be written as;

$$Vamb = \frac{(c \times WRF)}{(2 \times f)}$$

Where:
  Vamb=ambiguous velocity;
  c=the velocity of light;
  WRF=waveform repetition frequency; and
  f=carrier frequency.

As can be seen from the above equation, changes in the ratio of waveform repetition frequency to carrier frequency result in changes in the ambiguous velocity range. If the carrier frequency is varied, then the Doppler frequency varied. Previously, if the waveform repetition frequency varies and the Doppler frequency remained constant, then the target position on a display would vary. This is because the ambiguous velocity will vary and previously the display screen window size was constant for a specific ambiguous velocity.

As mentioned above, Over the Horizon Radar systems make use of the propagation characteristics of ionospheric propagation of radio waves. So the received radar returns are subject to the known characteristics of ionospheric propagation. As such, it is not uncommon for a radar return to be subject to fading and other atmospheric effects. The above is compounded with radar returns travelling via E layer, F layer or mix-mode paths. As a result, it can be very difficult to determine whether a radar return is a target or a spurious return.

SUMMARY OF THE INVENTION

Herein we describe a preferred display scheme, Azimuth Range Velocity Display, suitable for Over the Horizon Radar systems. In this particular display format, as exhibited in one preferred form, 10 azimuth regions form a vertical axis of a plot each with 20 range cells also vertically aligned. The horizontal axis against which the range and azimuth of a radar return is plotted are velocity. It will be appreciated that the invention is not to be limited to the particular preferred display scheme just mentioned.

It is an object of the invention to alleviate any one of the mentioned problems or at least provide the public with a useful alternative.

The invention may be said to reside in a method of displaying and determining the velocity associated with radar returns of frequency modulated continuous wave radars by way of a processor determining a velocity for each radar return from a detected beat frequency associated with received radar returns, displaying upon a visual display means for successive radar dwells one or more major plots indicating range, azimuth and velocity of any radar returns, each major plot being characterised by a velocity axis with a maximum and a minimum display velocity, the major plots being composed of minor plots indicating range, azimuth and velocity of any radar return and characterised by a velocity axis that extends between zero velocity and the magnitude of greatest possible velocity corresponding to the range of the detected beat frequencies, the minor plots being repeated end upon end with respect to the velocity axes whilst the velocity displayed is not larger than the said maximum display velocity or smaller than the said minimum display velocity, the transition from one of the minor plots to an adjacent minor plot corresponding with zero velocity, and the method being such that between successive radar dwells radar returns on one side of the said zero velocity remain substantially in the same display position whereas associated radar returns displayed on the other side of the zero velocity do not remain substantially in the same position.

Preferably the method is further characterised by the processor providing signal representation of return signal amplitude, and the displaying on the display of one or more plots of radar return amplitude versus radar return range.

Preferably the method is further characterised by the displaying of some information of the radar returns in a textual format.

Preferably the method is further characterised by the radar returns being generated with an Over-the-Horizon-Radar.

Preferably the method is further characterised by displaying a series of successive radar scans in a cyclically animating sequence.

Preferably the method is characterised by dividing the maximum value of a display velocity into k consecutive velocity bins, each velocity bin corresponding to a velocity range P, and interpolating the Doppler space data for each dwell into each velocity bin according to:

$$M = \left\{ \left( V_{amb} \times \frac{P}{V_{max}} \right) \right\}$$

where:
M = the range of Doppler data for each velocity bin;
$V_{amb}$ = the ambiguous velocity;
P = the region of velocity values for each velocity bin;
$V_{max}$ = the maximum velocity displayed; and
the function {arg} is the smallest integer greater than or equal to arg.

In preference, the interpolation of the Doppler data is according to a linear interpolation scheme or a nearest neighbour interpolation scheme.

Preferably the method is characterised by displaying range versus amplitude information of return signals.

Alternatively, the invention may be said to reside in an apparatus for displaying and determining the velocity associated with radar returns of frequency modulated continuous wave radars including a processor adapted to determine a velocity for each radar return from a detected beat frequency associated with received radar returns, a visual display adapted to display for successive radar dwells one or more major plots indicating range, azimuth and velocity of any radar returns, each major plot being characterised by a velocity axis with a maximum and a minimum display velocity, the major plots being composed of minor plots indicating range, azimuth and velocity of any radar return and characterised by a velocity axis that extends between zero velocity and the magnitude of greatest possible velocity corresponding to the range of the detected beat frequencies, the minor plots being repeated end upon end with respect to the velocity axes whilst the velocity displayed is not larger than the said maximum display velocity or smaller than the said minimum display velocity, the transition from one of the minor plots to an adjacent minor plot corresponding with zero velocity, and the apparatus being adapted so that between successive radar dwells radar returns on one side of the said zero velocity remain substantially in the same display position whereas associated radar returns displayed on the other side of the zero velocity do not remain substantially in the same position.

Preferably the apparatus is characterised by the processor providing signal representation of return signal amplitude, and the display displaying one or more plots of radar return amplitude versus radar return range.

Preferably the apparatus is characterised by the processor providing information to the display such that information of radar returns is displayed in a textual format.

Preferably the apparatus is characterised by the radar returns being generated with an Over-the-Horizon-Radar.

Preferably the apparatus is characterised by the processor means providing information to the display means such that a series of successive radar scans are displayed in a cyclically animating sequence.

Preferably the apparatus is characterised by the processor being adapted to divided the maximum value of a display velocity into k consecutive velocity bins, each velocity bin corresponding to a velocity range P, and Doppler space data for each dwell being interpolated into each velocity bin according to:

$$M = \left\{ \left( V_{amb} \times \frac{P}{V_{max}} \right) \right\}$$

where:
M = the range of Doppler data for each velocity bin;
$V_{amb}$ = the ambiguous velocity;
P = the region of velocity values for each velocity bin;
$V_{max}$ = the maximum velocity displayed; and
the function {arg} is the smallest integer greater than or equal to arg.

Preferably the apparatus is characterised by the processor being adapted to interpolate the Doppler data according to linear interpolation scheme or nearest neighbour interpolation scheme.

Preferably the apparatus is characterised by the processor being adapted to provide to the display means range versus amplitude information of return signals and the display means being adapted to display this range versus amplitude information.

Alternatively, the invention resides in a method of displaying and determining the velocity associated with radar returns of frequency modulated continuous wave radars by means of a processor determining a velocity for each radar return from a detected beat frequency associated with received radar returns, displaying upon a visual display for successive radar dwells one or more major plots indicating range, azimuth and velocity of any radar returns, each major plot being characterised by a velocity axis with a maximum and a minimum display velocity, the major plots being composed of minor plots indicating range, azimuth and velocity of any radar return and characterised by a velocity axis that extends between zero velocity and the magnitude of greatest possible velocity corresponding to the range of the detected beat frequencies, the minor plots being repeated end upon end with respect to the velocity axes whilst the velocity displayed is not larger than the maximum display velocity or smaller than the minimum display velocity, the transition from one of the minor plots to an adjacent minor plot corresponding with zero velocity, and the method being such that between successive radar dwells radar returns on one side of the zero velocity remain substantially in the same display position whereas associated radar returns displayed on the other side of the zero velocity do not remain substantially in the same position, and further characterised for assisting classification of the radar returns by displaying the radar returns on the display, and displaying predicted radar return positions of a radar return on the display where the prediction of the position of the radar returns is in accordance with radar return azimuth from the antenna and estimates of the heights of the E and F layers.

Alternatively, the invention resides in a method for assisting classification of radar returns including displaying the radar returns the visual display, displaying predicted radar return positions of a radar return on the display where the prediction of the position of the radar returns is in accordance with radar return azimuth from the antenna and estimates of the heights of the E and F layers.

Preferably, the displaying of radar returns is in accordance with a Azimuth Range Velocity Display scheme.

Preferably, the radar returns generated are radar returns from an Over the Horizon Radar.

Preferably, for a selected radar return, three predicted positions of the radar return are displayed, a first being in accordance with E layer propagation, a second in accordance with F layer propagation, and a third in accordance with mix-mode propagation.

Preferably, the predicted position of the radar return upon the visual display is further controlled by a control device.

Preferably, the control device is a trackball, computer mouse, or the like.

Preferably, as the control device is moved, the predicted position of the radar return is moved upon the visual display in accordance with the with radar return azimuth from the antenna and estimates of the heights of the E and F layers.

Preferably, any radar return corresponds to a dwell, the predicted positions of the radar returns displayed upon the visual display are recalculated assuming a constant velocity for that radar return, and repositioned for each dwell thereby forming an animinated time sequence of predicted position of the radar returns displayed upon the visual display.

Furthermore, the present invention may be said to reside in an apparatus for displaying and determining the velocity associated with radar returns of frequency modulated continuous wave radars including a processor adapted to determine a velocity for each radar return from a detected beat frequency associated with received radar returns, a visual display adapted to display for successive radar dwells one or more major plots indicating range, azimuth and velocity of any radar returns, each major plot being characterised by a velocity axis with a maximum and a minimum display velocity, the major plots being composed of minor plots indicating range, azimuth and velocity of any radar return and characterised by a velocity axis that extends between zero velocity and the magnitude of greatest possible velocity corresponding to the range of the detected beat frequencies, the minor plots being repeated end upon end with respect to the velocity axes whilst the velocity displayed is not larger than the said maximum display velocity or smaller than the said minimum display velocity, the transition from one of the minor plots to an adjacent minor plot corresponding with zero velocity, and the apparatus being adapted so that between successive radar dwells radar, returns on one side of the said zero velocity remain substantially in the same display position whereas associated radar returns displayed on the other side of the zero velocity do not remain substantially in the same position. The processor is further adapted to predict return positions of a radar return and effect display of the same on the visual display where the prediction of the position of the radar returns is in accordance with radar return azimuth from the antenna and estimates of the heights of the E and F layers.

In an alternative form, the invention may be said to reside in an apparatus adapted to assist classification of radar returns including the visual display adapted to display the radar returns, a processor adapted to predict radar return positions of a radar return and effect display of the same on the display where the prediction of the position of the radar returns is in accordance with radar return azimuth from the antenna and estimates of the heights of the E and F layers.

Preferably, the visual display is adapted to display the radar returns in accordance with an Azimuth Range Velocity Display scheme.

Preferably, the radar returns generated are radar returns from an Over the Horizon Radar.

Preferably, the processor calculates three predicted positions of a selected radar return and effects display of these upon the visual display of the three predicted positions a first is in accordance with E layer propagation, a second in accordance with F layer propagation, and a third in accordance with mix-mode propagation.

Preferably, the predicted position of the radar return upon the visual display is further controlled by a control device.

Preferably, the control device is a trackball, computer mouse, or the like.

Preferably, as the control device is moved the predicted position of the radar return is moved upon the display means in accordance with the with radar return azimuth from the antenna and estimates of the heights of the E and F layers.

Preferably, any radar return corresponds to a dwell, the predicted positions of the radar returns calculated by the processor and displayed upon the display are recalculated assuming a constant velocity for that radar return, and repositioned upon the display for each dwell thereby forming an animinated time sequence of predicted position of the radar returns displayed upon the display.

The invention will now be described with reference to the accompanying diagram.

It will be appreciated that the Figures are for illustrative purposes only and not to be taken as accurate representations.

DETAILED DESCRIPTION OF THE PREFERRED EMBODIMENTS

Figure 1A:
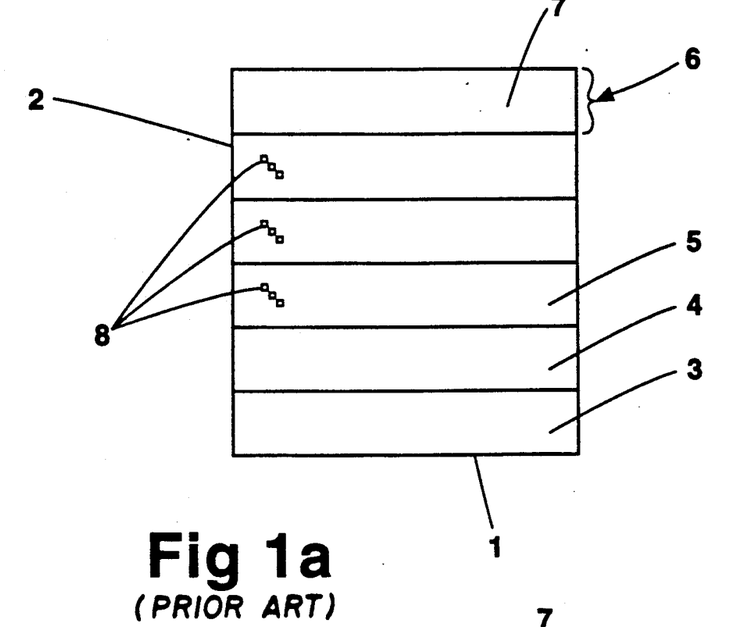
In FIG. 1a but illustrates a portion of a known display screen format.
Figure 1B:
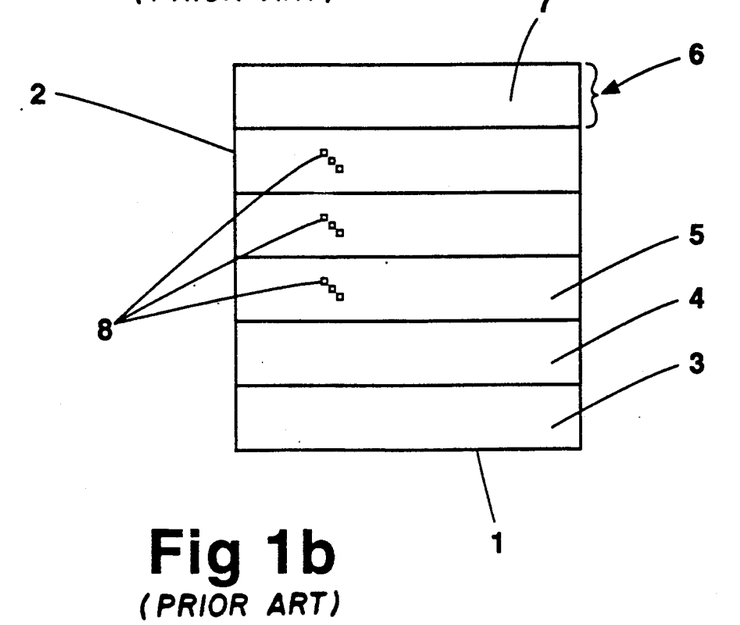
FIG. 1b illustrates the same display as FIG. 1 with a subsequent frame displayed.

The illustration shown in FIG. 1a and FIG. 1b are for a display of an Over-the-Horizon-Radar system. The horizontal axis 1 is the Doppler frequency. The vertical axis 2 is the azimuth or radar beam data. The vertical axis consists of a plurality of beams such as 3, 4 and 5 for example. The range 6 of a target is the vertical component of the display for each radar beam, for example of beam 7. This leads to the name of Azimuth, nested Range versus Doppler. The problem of Doppler jitter is illustrated by sequential frames of the display of target 8; this is for exemplification purposes only. Note the horizontal shift in target display location.

For a display window of a constant size the above mentioned problems can fully or partly be alleviated. Accordingly, the return signals are plotted in terms of velocity instead of Doppler frequency. For a given radar set-up, the carrier frequency and the waveform repetition frequency will vary within set limits. Consequently, the ambiguous velocity will vary within corresponding limits. The maximum value of the velocity axis displayed will be set greater than the maximum value of the ambiguous velocity.

With the data in this format then, the vertical axis remains the same as for the known format illustrated in FIGS. 1a and 1b. Now referring to FIG. 2, the horizontal axis 9 will now be velocity not Doppler frequency. This leads to the name Azimuth, nested Range versus Velocity.

Figure 2:
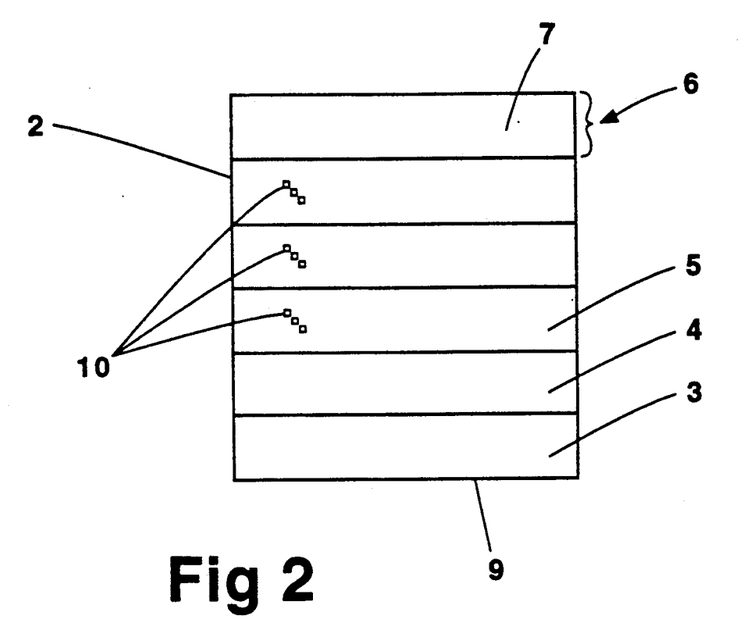
FIG. 2 illustrates a portion of a display screen forming part of the invention.

To form the display of FIG. 2, the region for the plot is divided into a matrix of cells which can correspond to display pixels. The maximum value of the displayed velocity is divided into a plurality of consecutive discrete velocity bins or cells. The number of velocity bins being k and would be 200 for the embodiment. Each discrete velocity bin will have a corresponding velocity range (P). For each dwell, there is a portion of the Doppler space data corresponding to each discrete velocity bin which can vary from dwell to dwell. The Doppler space data for each dwell consists of N Doppler data cells. The Doppler data from a given dwell is interpolated into these velocity bins. The range of Doppler data interpolated into each velocity bin can be calculated from:

$$M = \left\{ \left( V_{amb} \times \frac{P}{V_{max}} \right) \right\}$$

where:
  $M$ = the range of Doppler data for each velocity bin;
  $V_{amb}$ = the ambiguous velocity;
  $P$ = the region of velocity values for each velocity bin;
  $V_{max}$ = the maximum velocity displayed; and arg.
  the function {arg} is the smallest integer greater than or equal to With the restriction that $V_{max} > V_{amb}$, the range of Doppler data for each velocity bin (M) is always less than the region of velocity values (P) for each velocity bin.

To prevent data compression, the range of Doppler data (M) for each velocity bin should be greater than the number of Doppler data cells. This is impractical in general. However, some data compression is tolerable in practical circumstances. The number of Doppler data cells in the embodiment was chosen to be 128. The display window size for the velocity axis was chosen to be 200 pixels. This corresponds to the number of velocity bins k being equal to 200. Further, this will generally result in $M > N$.

The Doppler data cells can be interpolated into the velocity cells k by various schemes including linear interpolation and nearest neighbour interpolation. Linear interpolation can be expressed as:

$$V(x) = a \times D(i) + b \times D(i+1)$$

where:
  $D(i)$ are the Doppler samples;
  $V(x)$ are the interpolated velocity samples;
  $i \leq x \leq i+1$; and
  $a + b = 1$.

Nearest Neighbour Interpolation or replication is straightforward with the velocity sample being derived from the nearest Doppler cell. The former scheme is more accurate and provides higher video quality but the latter is quicker to implement on a digital processor. The latter scheme can lead to 'soft' striping effect if $M > N$ or discarding of data if $N > M$.

FIG. 2 also illustrates a target return of a target 10 typical of Over-the-Horizon-Radar returns.

Figure 3:
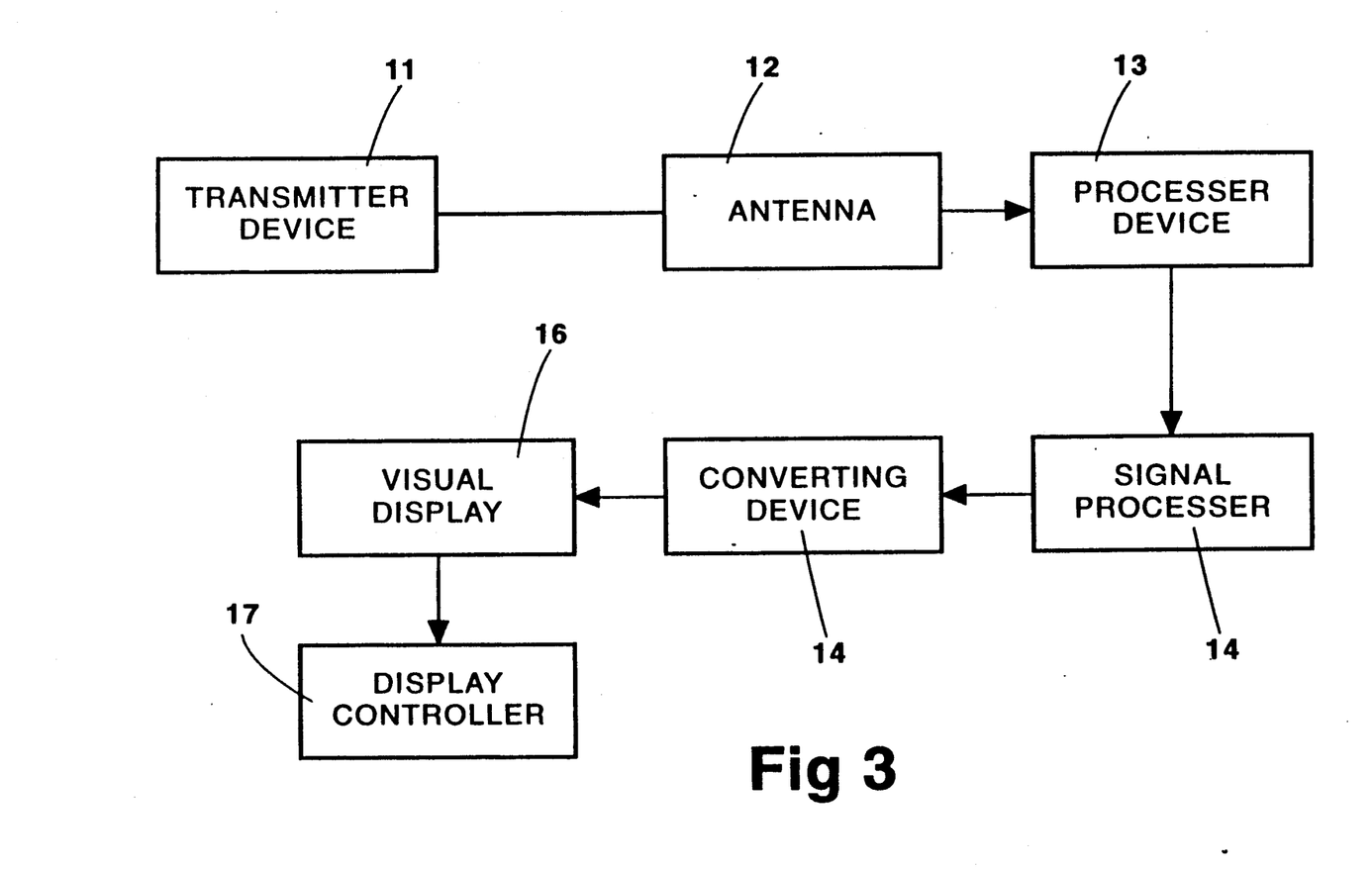
FIG. 3 illustrates in block diagram form an apparatus exhibiting the invention.

In FIG. 3 the apparatus exhibiting the invention as a whole is illustrated in block diagram form. This is of an Over-the-Horizon-Radar system such as the Jindalee Over-the-Horizon-Radar developed by the Defense Science and Technology Organisation, Salisbury, South Australia. The apparatus includes a transmitter device 11 adapted to transmit the energy at the desired waveform repetition frequency and carrier frequency. The radar return signals are detected by antenna means 12 which includes RF stages. Antenna 12 is adapted to supply information to processor device 13. A number of radar return signals may be associated with one radar target; for example an aeroplane in flight often provides three return signals, one for F layer propagation, one for E layer propagation, and one for mix-mode propagation.

Processor device 13 is adapted to provide signal representation of the received radar return signals and antenna aperture azimuth. The outputs of the processor device 13 are further processed by signal processor 14 which is adapted to provide raw display signals. Velocity of a target is determined from the beat frequency due to the radar return signal.

The raw display signals represent azimuth of the antenna aperture, Doppler frequency of any radar return signals and range of any radar return signals. The range of a radar return signal is the range or distance from the antenna to the target causing the return signal.

The raw display signals are supplied to the converting device 15 adapted to convert for each radar sweep or dwell the Doppler frequency signals of any return signals to velocity signals by interpolation. This has been described earlier. The converted raw data is displayed on a visual display 16. A display controller 17 is adapted to control the visual display 16.

Figure 5:
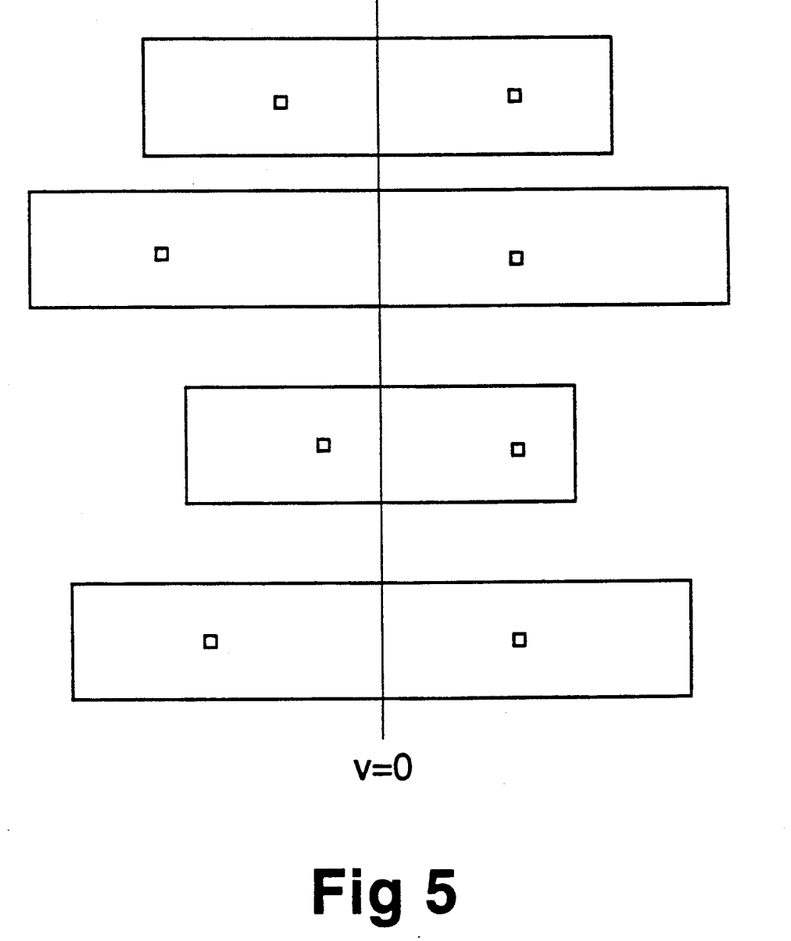
FIG. 5 illustrates radar returns for a series of radar dwells.

Due to the varying ambiguous velocity, the maximum value of any target for any dwell will vary. As illustrated in FIG. 5, the displayed velocity range from the beat frequency will vary. However, a radar return will appear substantially in the same position on one side of the zero line, and on the other side it will jitter. The is apparent on the right hand side of the line v=0 compared with that on the left hand side. When a series is displayed, an operator is able to determine which of the radar returns are true and which are due to the beat frequency. Such a display makes use of visual integration.

The transmitter device 11 and antenna 12 can be any of the suitable forms known in the art. The display controller 17, display 16, signal processor 14 and converting device 15 can be any suitable computer and peripheral hardware known to the art. The invention does not lie within any of the known specific details of any of the above mentioned component parts of the invention but in the combination of those parts and the display of the radar return signals in terms of velocity instead of Doppler frequency.

Figure 4:
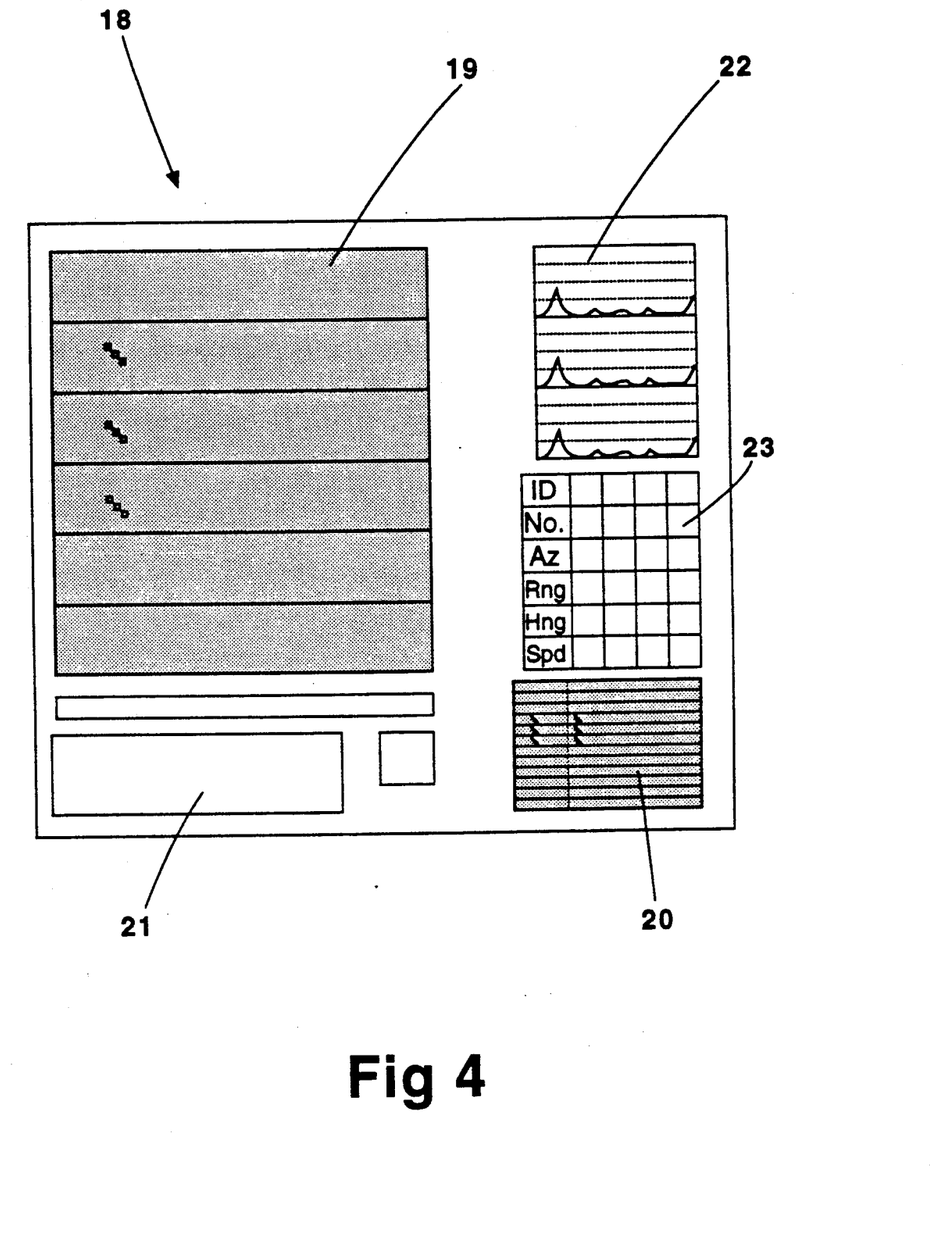
FIG. 4 illustrates a display screen forming part of the invention.

In FIG. 4, a full video display 18 is illustrated showing the portion illustrated in FIG. 2 and other information useful in the use of a radar. This is an exemplary display. As can be seen, the full display 18 includes the display 19 of FIG. 2, an overview display 20, radar information 21, received return beam amplitude 22 and target information 23.

The display 19 is an enlarged portion of the overview display 20. The overview display 20 allows a radar operator to see all or a large portion of the radar return information and then referring to the display 19 obtain detailed information if required. The radar information 21 gives visual indication to a radar operator of the operating parameters of the radar.

The received return beam amplitude 22 is a plot of the range versus amplitude information of return signals. This can be used to facilitate recognition of closely space targets.

The display of a velocity range greater than the ambiguous velocity can be achieved by displaying multiple copies of the single ambiguity. These copies are not identical, but should be shifted one range cell for each multiple of the ambiguous velocity away from zero. This is due to the range-Doppler coupling inherent in the processed data. The range shift can be ignored for display purposes and accounted for in the algorithms that interpret peak locations and overlay tracks on the video data.

A display cursor may be used to select one or more targets that an operator wishes to interrogate. Target information such as range, velocity, heading etc can be displayed in the target information 23 portion of the display.

The ultimate task of the operators is to classify the mode structure of target returns. Multimode conditions are prevalent in the Australian environment, and in other locations, generally resulting in resolvable returns from the E and F layers, as well as a mixed mode return. A number of factors contribute to make mode classification non-trivial.

Further, it will be appreciated that a number of radar return signals may be associated with one radar target; for example an aeroplane in flight often provides three return signals, one for F layer propagation, one for E layer propagation, and one for mix-mode propagation.

Figure 6A:
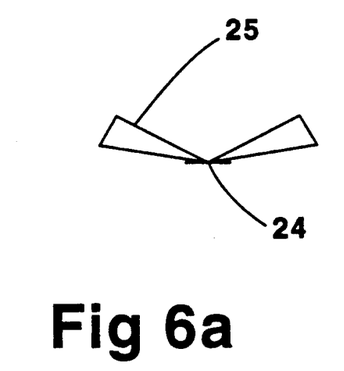
FIGS. 6a and 6b show a sketch of illustrating the conical nature of an long antenna array.
Figure 6B:
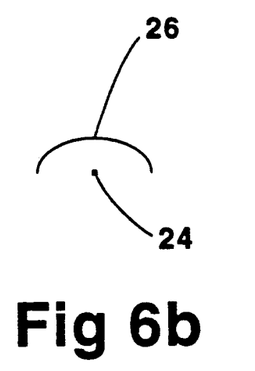

As the radar is steered away from boresight, the azimuth of the multimode returns diverge because the different mode elevation angles lead to different measured angles. The conical field pattern is illustrated in FIG. 6. FIG. 6 illustrates the antenna beam pattern showing the substantially conical shape 25. This view is broadside to the antenna array 24. The arc transversed by the antenna beam 26 increases in elevation as the azimuth is increased from broadside. At large steer angles, the difference is sufficient for multimode returns from a target to appear in different beams, and therefore be vertically separated on the Azimuth, nested Range verses Velocity (ARV) display. This effect, coupled with the independent fading characteristics of the returns, conspire to make operator classification of multimode difficult.

Figure 7:
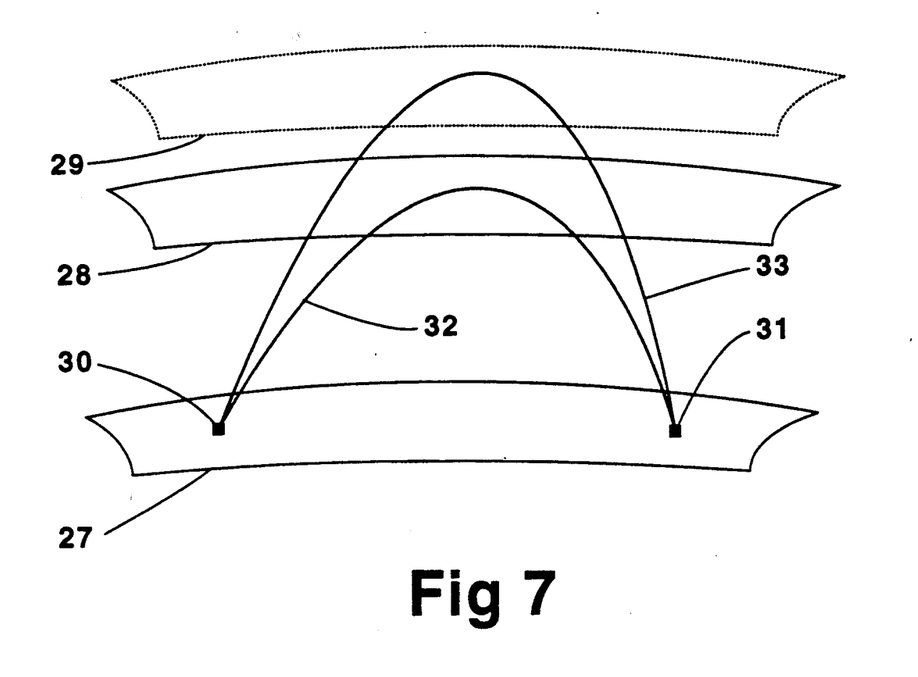
FIG. 7 is a sketch of the paths of the radar returns.

Mix-mode path is where a target is radiated with energy via either the E or F layer and returned by the other. So mix-mode returns have a range in between that of the E and the F layer paths. It is desirable to determine which of the radar returns are due to E, F or mix-mode paths so the range can be determined. These paths are illustrated in FIG. 7. In FIG. 7, the Earth 27 is encompassed by E layer 28 and F layer 29. A target is illustrated at 30 with a receiving antenna at 31. The E layer progation path is marked by 32 and the F layer path is marked by 33. Energy of radar returns of mixmode paths go out to the target via one of the Layer paths and return by the other.

The velocity measured by the radar is proportional to the cosine of the elevation angle, consequently the measured velocity of each mode is different. As the velocity increases so does the difference, giving the returns a characteristic slope in range-velocity co-ordinates. Multimode returns therefore can differ in all the measured dimensions of range, azimuth and velocity.

A dynamic template has been developed to assist in identifying multimode returns. The template, in this embodiment, consists of three circles, each are approximately the expected size of a target return, positioned in azimuth-range-velocity space consistent with the expected location of the multimode returns.

The template is controlled by a control device, such as a trackball, computer mouse or the like, and can be considered to be a complex cursor. As the template is moved, the locations of the returns are dynamically re-calculated to maintain the correct relation. The locations are determined by using the position of the trackball to define the mixed mode in slant co-ordinates.

These are converted to a ground position, which are then used to calculate the E and F mode returns in slant co-ordinates using the appropriate Ionospheric heights. To simplify this computation, the Earth, E and F layer are assumed to be concentric spheres.

Figure 8:
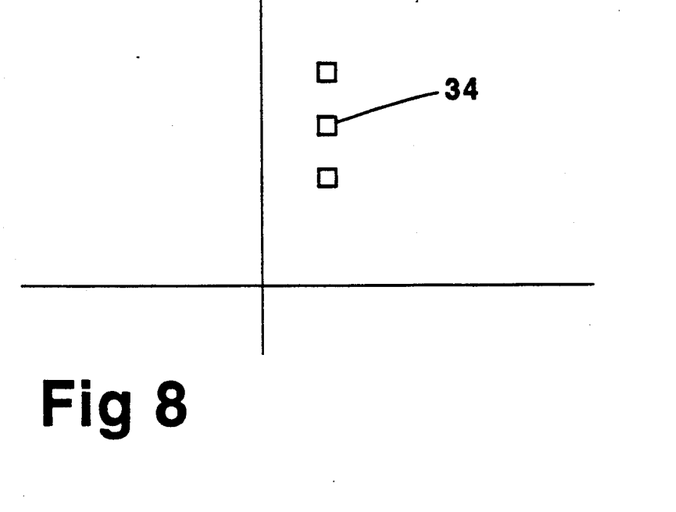
FIG. 8 is a sketch of the template for a low velocity target.
Figure 9:
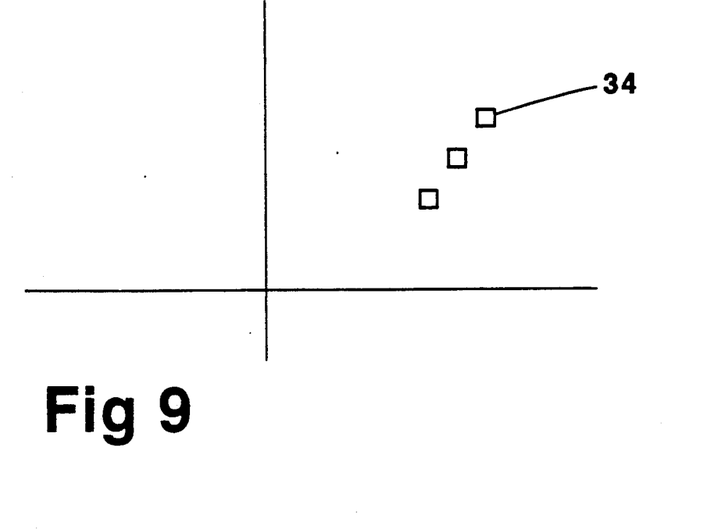
FIG. 9 is a sketch of the template for a high velocity target showing the characteristic slope.

To illustrate the template showing the characteristic slope due to velocity of a target, refer to FIGS. 8 and 9. FIG. 8 is when a target 34 is travelling at a low velocity and FIG. 9 is when a target 34 is travelling at a high velocity. The slope is due to the different incident angle at the target between E layer, F layer and mix-mode propagations. The Doppler velocity detected is related to the cosine of the incident angle which is greater for a smaller incident angle.

An additional feature of this template which can be invoked during an animation sequence is called "velocity locking". In this case the position of the template is automatically updated from dwell to dwell. The range and velocity co-ordinates of the current template position are used to determine its new position in the next dwell of the sequence, assuming a constant velocity. So if the template were positioned on a set of peaks, then as the animation progresses the template automatically follows those peaks. Obviously only peaks that correlate in range progression and velocity will be shadowed by the template. Transponder returns, manoeuvering targets and helicopters do not meet this criterion.

The range cuts are associated with the cursor, and therefore the template position. When velocity locking is invoked, the displayed range cuts will be dynamically updated. If the template is highlighting a target, then the selected range lines will always display the target as the animation proceeds.

To facilitate correlation of the automatic tracking output with the radar returns, the filtered track positions are overlayed on the video data. The track histories for the whole animated sequence of dwells are displayed. Alternatively, only the track position for the dwell currently in view was overlayed. Display of the full track history can sometimes obscure the underlying detections, particularly if the target progresses in range by the spacing of the multimode returns during the animation sequence. In this case, the track histories from the multimode returns coalesce. The single track positions are then more useful, although the history option will highlight the fact that a target is manoeuvering.

It will be appreciated that by use of the template, classification of radar returns is simplified. Further, the effects of fading and etc are reduced with the template, as temporary non radar returns do not mean loss of radar target display position. When fading and etc does not occur, the radar return will be within the vicinity of the predicted position. Also, when one or more return paths are not providing radar returns, i.e. the E or the F layer, then an operator may locate the template upon a suspected target radar return and correct the position when it becomes apparent that it is necessary. That is if the F layer is, not providing a radar return path for a dwell and the mix-mode path is taken by the operator as the F layer then when the F layer, is providing a radar return, the operator can readily correct the positioning of the template.

It will be apparent to those skilled in the art that there are many ways of implementing the invention disclosed herein. All such implementations would fall within the spirit of the invention. It will also be apparent that the template can be used to tag a radar return and so enable a target to be selected. Further, information of the selected target can be displayed in textual and other formats.

We claim:

1. A method for displaying and determining the velocity associated with received radar return signals from frequency modulated continuous wave radar systems, comprising the steps of:

determining a velocity for each radar return signal from a detected beat frequency associated therewith; and displaying, on a visual display system having successive radar dwells, one or more major plots indicating range, azimuth and velocity of said each radar return signal, whereby:

each major plot is associated with a velocity axis assigned a maximum and a minimum display velocity;

each said major plot is composed of minor plots indicating range, azimuth and velocity of each radar return signal and associated with a velocity axis extending between zero velocity value and a magnitude value of greatest possible velocity corresponding to a range of detected beat frequencies;

said minor plots are repeated, end upon end with respect to the velocity axes, whilst the velocity displayed is not larger than said maximum display velocity nor smaller than said minimum display velocity; and the transition from one minor plot to an adjacent minor plot corresponds to zero velocity; and wherein, between successive radar dwells, radar return signals falling on one side of said zero velocity value remain substantially in a same display position, while radar return signals, falling on an opposite side of the zero velocity value, do not remain substantially in the same display position.

2. A method as in claim 1, wherein a processor provides signal representation of radar return signal amplitude and displays on the visual display system one or more plots of radar return signal amplitude versus radar return signal range.

3. A method as in claim 1, further comprising the step of displaying information relating to the received radar return signals in a textual format.

4. A method as in claim 1, wherein the received radar return signals are generated by an Over-the-Horizon-Radar.

5. A method as in claim 1, further comprising the step of displaying a series of successive radar scans in a cyclically animating sequence.

6. A method as in claim 1, further comprising the steps of:

dividing said maximum display velocity into k consecutive velocity bins, each velocity bin corresponding to a velocity range P; and interpolating the Doppler space data for each dwell into each velocity bin according to:

$$M = \left\{ \left( V_{amb} \times \frac{P}{V_{max}} \right) \right\}$$

where:

M = the range of Doppler space data for each velocity bin;
$V_{amb}$ = the ambiguous velocity;
P = the region of velocity values for each velocity bin;
$V_{max}$ = the maximum velocity displayed; and
the function {arg} is the smallest integer greater than or equal to arg.

7. A method as in claim 6, wherein the interpolating step is performed according to one of a linear interpolation scheme and a nearest neighbor interpolation scheme.

8. A method as in claim 1, further comprising the step of displaying range versus amplitude information of said received return signals.

9. An apparatus for displaying and determining the velocity associated with received radar return signals transmitted from frequency modulated continuous wave radar systems, comprising:
processor means for calculating a velocity for each radar return signal from a detected beat frequency associated therewith; and
visual display means for displaying successive radar dwells as one or more major plots to indicate range, azimuth and velocity of said each radar return signal, whereby:
each major plot is associated with a velocity axis assigned a maximum and a minimum display velocity;
each said major plot is composed of minor plots indicating range, azimuth and velocity of each radar return signal and associated with a velocity axis extending between zero velocity value and a magnitude value of greatest possible velocity corresponding to a range of detected beat frequencies;
said minor plots are repeated, end upon end with respect to the velocity axes, whilst the velocity displayed is not larger than said maximum display velocity nor smaller than said minimum display velocity; and
the transition from one minor plot to an adjacent minor plot corresponds to zero velocity; and
wherein, between successive radar dwells, radar return signals falling on one side of said zero velocity value remain substantially in a same display position, while radar return signals falling on an opposite side of the zero velocity value, do not remain substantially in the same display position.

10. An apparatus as in claim 9, wherein said processor means comprises means for generating signals representative of radar return signal amplitude, and wherein said visual display means includes means for displaying one or more plots of radar return signal amplitude versus radar return signal range.

11. An apparatus as in claim 9, wherein said processor means comprises means for generating information signals, relating to the received radar return signals, said information signals being displayed by said visual display means in textual format.

12. An apparatus as in claim 9, wherein said radar systems are of the over-the-Horizon-Radar type.

13. An apparatus as in claim 9, wherein said processor means includes means for providing information to said visual display means such that a series of successive radar scans are displayed in a cyclically animating sequence.

14. An apparatus as in claim 9, wherein said processor means further comprises:
means for dividing said maximum display velocity into k consecutive velocity bins, each velocity bin corresponding to a velocity range P; and
means for interpolating Doppler space data for each dwell into each velocity bin according to:

$$M = \left\{ \left( V_{amb} \times \frac{P}{V_{max}} \right) \right\}$$

where:
M = the range of Doppler space data for each velocity bin;
$V_{amb}$ = the ambiguous velocity;
P = the region of velocity values for each velocity bin;
$V_{max}$32 the maximum velocity displayed; and
the function {arg} is the smallest integer greater than or equal to arg.

15. An apparatus as in claim 14, wherein the interpolating of Doppler space data is performed according to one of a linear interpolation scheme and a nearest neighbor interpolation scheme.

16. An apparatus as in claim 14, wherein said processor means comprises means for providing, to said visual display means for display thereof, range versus amplitude information relating to said radar return signals.

17. A method for assisting classification of radar return signals, comprising the steps of displaying said radar return signals on a visual display, predicting radar return signal positions, and displaying the predicted radar return signal positions on the visual display, wherein the prediction of the position of the radar return signals is performed on the basis of a radar return signal azimuth from an antenna and estimates of the heights of ionospheric E and F layers.

18. A method as is claim 17, further comprising the steps
calculating the velocity associated with radar return signals generated by frequency modulated continuous wave radar systems using a processor;
displaying said velocity;
calculating a velocity for each radar return signal from a detected beat frequency associated therewith; and
displaying, on the visual display having successive radar dwells, one or more major plots indicating range, azimuth and velocity of said each radar return signal, whereby:
each major plot is associated with a velocity axis assigned a maximum and a minimum display velocity;
each said major plot is composed of minor plots indicating range, azimuth and velocity of each radar return signal and associated with a velocity axis extending between zero velocity value and a magnitude value of greatest possible velocity corresponding to a range of detected beat frequencies;
said minor plots are repeated, end upon end with respect to the velocity axes, whilst the velocity displayed is not larger than said maximum display velocity nor smaller than said minimum display velocity; and the transition from one minor plot to an adjacent minor plot corresponds to zero velocity; and wherein, between successive radar dwells, radar return signals falling on one side of said zero velocity value remain substantially in a same display position, while radar return signals, falling on an opposite side of the zero velocity value, do not remain substantially in the same display position.

19. A method as in one of claim 17 and 18, wherein the displaying of radar return signals is in accordance with an Azimuth Range Velocity Display scheme.

20. A method as in one of claims 17 and 18, wherein the radar return signals are from an Over-the-Horizon Radar.

21. A method as in one of claims 17 and 18, wherein for a selected radar return signal, three predicted positions are displayed, a first being in accordance with E layer propagation, a second in accordance with F layer propagation, and a third in accordance with mix-mode propagation.

22. A method as in one of claims 17 and 18, wherein the display of predicted positions of radar return signals is controlled by a control device.

23. A method as in claim 22, wherein said control device is one of a trackball and a computer mouse.

24. A method as in claim 22, wherein as said control device is moved, the predicted position of a radar return signal is moved on the visual display in accordance with the radar return azimuth from the antenna and estimates of the heights of the E and F layers.

25. A method as in one of claims 17 and 18, wherein a radar return signal corresponds to a dwell, the predicted position of a radar return signal displayed by the visual display is recalculated assuming a constant velocity for that radar return signal, and repositioned for each dwell thereby forming an animated time sequence of predicted positions for the radar return signals displayed.

26. An apparatus for assisting classification of radar return signals, comprising visual display means for displaying said radar return signals, means for predicting radar return signal positions, and means for displaying the predicted radar return signal positions on the visual display means, wherein the prediction of the position of the radar return signals is performed on the basis of a radar return signal azimuth from an antenna and estimates of the heights of ionospheric E and F layers.

27. An apparatus as in claim 26, further comprising:
processor means for calculating the velocity associated with radar return signals generated by frequency modulated continuous wave radar systems;
means for calculating a velocity for each radar return signal from a detected beat frequency associated therewith; and
means for displaying, on the visual display means having successive radar dwells, one or more major plots indicating range, azimuth and velocity of said each radar return signal, whereby:

each major plot is associated with a velocity axis assigned a maximum and a minimum display velocity;

each said major plot is composed of minor plots indicating ranger, azimuth and velocity of each radar return signal and associated with a velocity axis extending between zero velocity value and a magnitude value of greatest possible velocity corresponding to a range of detected beat frequencies;

said minor plots are repeated, end upon end with respect to the velocity axes, whilst the velocity displayed is not larger than said maximum display velocity nor smaller than said minimum display velocity; and the transition from one minor plot to an adjacent minor plot corresponds to zero velocity; and wherein, between successive radar dwells, radar return signals falling on one side of said zero velocity value remain substantially in a same display position, while radar return signals, falling on an opposite side of the zero velocity value, do not remain substantially in the same display position.

28. An apparatus as in one of claims 26 and 27, wherein the visual display means displays the radar return signals in accordance with an Azimuth Range Velocity Display scheme.

29. An apparatus as in one of claims 26 and 27, wherein the radar return signals are from an Over-the-Horizon Radar.

30. An apparatus as in one of claims 26 and 27, wherein the processor means includes means for calculating three predicted positions of a selected radar return and effects display of these by the visual display means, a first predicted position being in accordance with E layer propagation, a second in accordance with F layer propagation, and a third in accordance with mix-mode propagation.

31. An apparatus as in one of claims 26 and 27, wherein the display of a predicted position of a radar return signal is controlled by a control device.

32. An apparatus as in claim 31, wherein said control device is one of a trackball or a computer mouse.

33. An apparatus as in claim 31, wherein as the control device is moved, the predicted position of the radar return signal is moved on the visual display means in accordance with the radar return signal azimuth from the antenna and estimates of the heights of the E and F layers.

34. An apparatus as in one of claims 26 and 27, wherein a radar return signal corresponds to a dwell, the predicted position of a radar return signal displayed by the visual display means is recalculated assuming a constant velocity for that radar return signal, and repositioned for each dwell thereby forming an animated time sequence of predicted positions for the radar return signals displayed.

* * * * *

UNITED STATES PATENT AND TRADEMARK OFFICE
CERTIFICATE OF CORRECTION

PATENT NO. : 5,334,985
DATED : August 2, 1994
INVENTOR(S) : TUCKER et al.

It is certified that error appears in the above-indentified patent and that said Letters Patent is hereby corrected as shown below: On title page, item

[73] Assignee:   The Commonwealth of Australia, Canberra, Australia

Signed and Sealed this

Thirty-first Day of January, 1995

Attest:

BRUCE LEHMAN

*Attesting Officer*   *Commissioner of Patents and Trademarks*